A. J. BASTIAN.
MOLDING PROCESS AND APPARATUS.
APPLICATION FILED MAY 7, 1917.
1,354,156.
Patented Sept. 28, 1920.
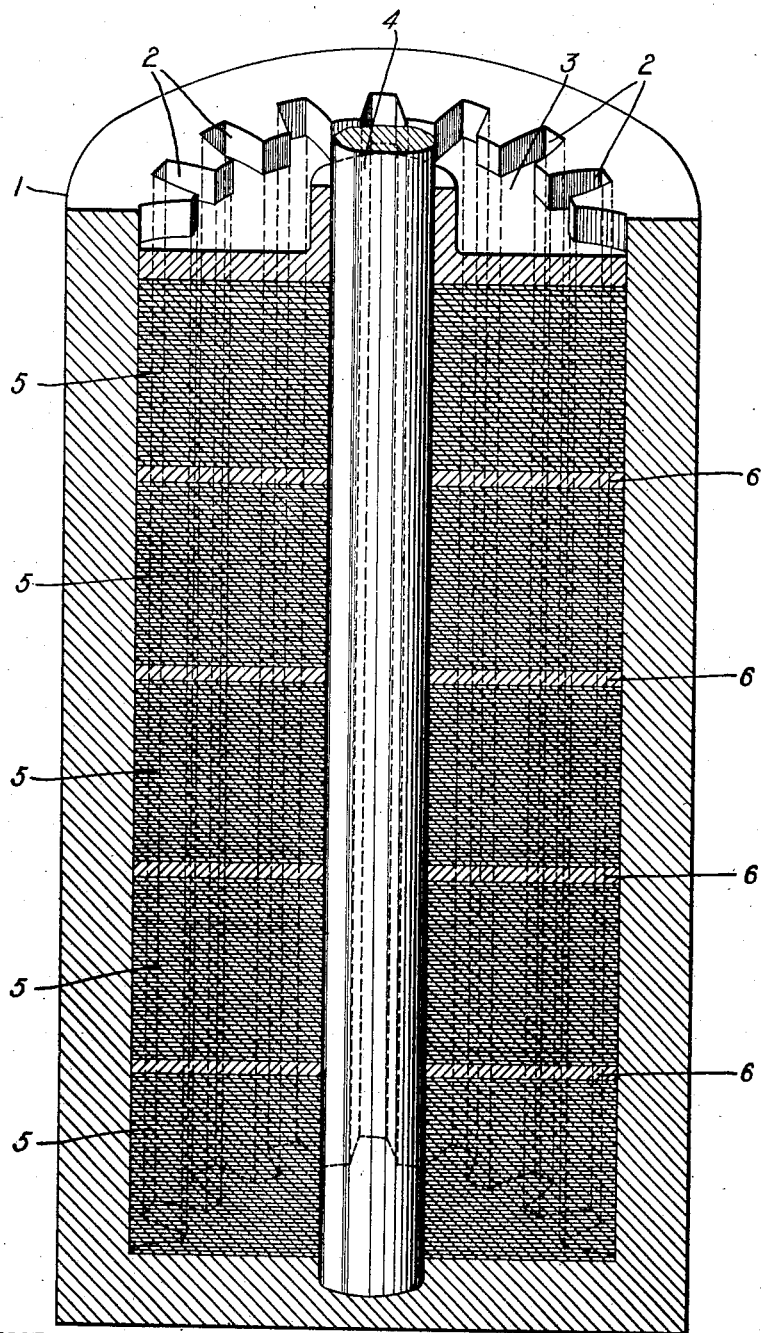
WITNESSES:
INVENTOR
Arthur J. Bastian.
BY
ATTORNEY

UNITED STATES PATENT OFFICE.

ARTHUR J. BASTIAN, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MOLDING PROCESS AND APPARATUS.

1,354,156.          Specification of Letters Patent.      Patented Sept. 28, 1920.

Application filed May 7, 1917. Serial No. 167,134.

*To all whom it may concern:*

Be it known that I, ARTHUR J. BASTIAN, a citizen of the United States, and a resident of Edgewood Park, in the county of Allegheny and State of Pennsylvania, have invented a new and useful Improvement in Molding Processes and Apparatus, of which the following is a specification.

My invention relates to the manufacture of molded articles, and it has special reference to processes of making such articles by applying pressure to masses or superposed sheets of fibrous material associated with adhesive binders. One specific application of my present process is in the manufacture of gear wheels and pinions composed of sheets of paper or cloth, or loose fibers of cotton or other strong fibrous material, coated or impregnated with a suitable adhesive material and caused to adhere together by means of heat and pressure.

The single figure of the accompanying drawing is a central vertical sectional view showing a multiple mold adapted for use in carrying out the process of my invention.

In my Patent, No. 1,223,348, dated April 17, 1917, I have described and claimed a process of making shaped articles such as gear wheels and pinions by coating or impregnating sheets of fibrous material, such as cotton duck, with an adhesive material that is adapted to harden under the influence of heat and pressure, punching blanks from the coated or impregnated sheets that correspond in size and outline to the shape of the finished article, stacking a suitable number of the punched blanks in accordance with the desired thickness of the finished article and finally pressing the assembled stack in a hot mold that is shaped to conform exactly to the outline of the gear or other desired article. The heat and pressure are continued in the mold long enough to fuse the adhesive material and to firmly unite all of the blanks, after which the mold is allowed to cool and the finished article is removed therefrom. If the adhesive material is of such a nature that it becomes hard and infusible under the influence of heat and pressure, such, for example, as the well known phenolic condensation products, the heat and pressure in the mold are continued until the material is fully cured and the adhesive material hardened and rendered resistant to temperature changes.

My present invention constitutes an improvement over the process outlined above and claimed in my copending application for patent, whereby a number of gear wheels or other articles may be produced in a single molding operation. I accomplish this result by providing a mold corresponding in cross-section to the outline of the desired article and of a depth sufficient to contain several such articles. The material of which the first article is to be composed is placed in the bottom of the mold and a separating plate, suitably of metal, is placed upon this material. Another portion of molding material is placed upon the separating plate and the alternate introduction of molding material and separating plates is continued until the mold is filled. A pressure member of the proper outline is then forced into the top of the mold to apply pressure simultaneously to the entire contents of the mold. The pressing operation consumes substantially the same time as is required for molding a single article and the rapidity and economy of the operation are therefore greatly increased.

My process is illustrated in the accompanying drawing, which shows a mold comprising a matrix member 1, the inner walls of which are provided with depressions 2 corresponding in outline to a set of gear teeth. A plunger member 3, corresponding in outline to the interior of the matrix member 1, is adapted to be forced into the open upper end of the matrix member by any suitable pressure-applying means (not shown) and surrounds a central rod 4 which extends lengthwise through the matrix member to form the central openings in the gears. The mold, as shown, containers several superposed bodies of molding material 5 separated by plates 6 which correspond in outline to the shape of the mold and serve to separate the adjacent sections of the molding material and to prevent such sections from adhering together.

The bodies 5 may be composed of any suitable molding material. For example, they may consist of sheets of paper or cloth coated or impregnated with a phenolic condensation product or other binder which is adapted to be hardened by the application of heat and pressure. The binder may consist of any other suitable adhesive substance, such as the varnish gums and gum resins, among which may be mentioned shellac, kauri, copal and the like. The absorbent portion of the molding mixture may consist of loose fibers of asbestos, cotton, hemp and the like and may contain suitable reinforcing plates or wires if such reinforcement is desired.

The apparatus illustrated in the drawing is operated in the manner described above by superposing alternate bodies of molding material and separating plates, inserting the plunger member 3 into the mold and applying heavy pressure to the plunger in order to effectively compact the contents of the mold and to transform the molding material into a solid and homogeneous mass. The mold is heated by any suitable means during the pressing operation and is cooled before the pressure is released if the binder employed is of a kind that remains permanently plastic when heated.

While I have described my invention in connection with the manufacture of molded gear wheels and pinions, it is to be understood that my process may be applied equally well to the manufacture of molded objects of other shapes. It is also to be understood that the specific materials which I have described are intended to be merely illustrative and not to impose restrictions upon my invention, the scope of which is set forth in the appended claims.

I claim as my invention:

1. The process of producing molded articles that comprises superposing in a mold a plurality of bodies of moldable material separated by plates conforming in outline to the shape of the mold, each of the bodies of moldable material being composed of sheets of fibrous material associated with a binder that is adapted to soften when heated and to harden under the influence of pressure and further heat, and applying heat and pressure simultaneously to all of the superposed bodies.

2. The process of producing molded gears that comprises superposing, in a mold having a cross-sectional outline conforming in shape and size to the finished gear, a plurality of separate bodies of moldable material severally consisting of stacked laminations of fibrous material associated with a binder, interposing separating material between the bodies, and applying pressure simultaneously to all of the superposed bodies.

3. The process of producing molded gears that comprises superposing in a mold having a cross-sectional outline, conforming in shape and size to the finished gear, a plurality of separate bodies of moldable material severally consisting of stacked laminations of fibrous material associated with a binder comprising a phenolic condensation product, interposing separating material between the bodies, and applying pressure simultaneously to all of the superposed bodies.

4. Molding apparatus comprising a mold provided with a chamber conforming in cross section to the shape of a gear, the chamber being comparable in depth to the total thickness of a plurality of gears, plates conforming in outline to the cross sectional shape of the said chamber for separating bodies of moldable material within the chamber and a plunger adapted to be forced into the end of the said chamber and corresponding in shape thereto.

In testimony whereof I have hereunto subscribed my name this 30th day of April, 1917.

ARTHUR J. BASTIAN.